DeW. FORD & F. G. BUTLER.
Milk-Cooler.
No. 215,903. Patented May 27, 1879.
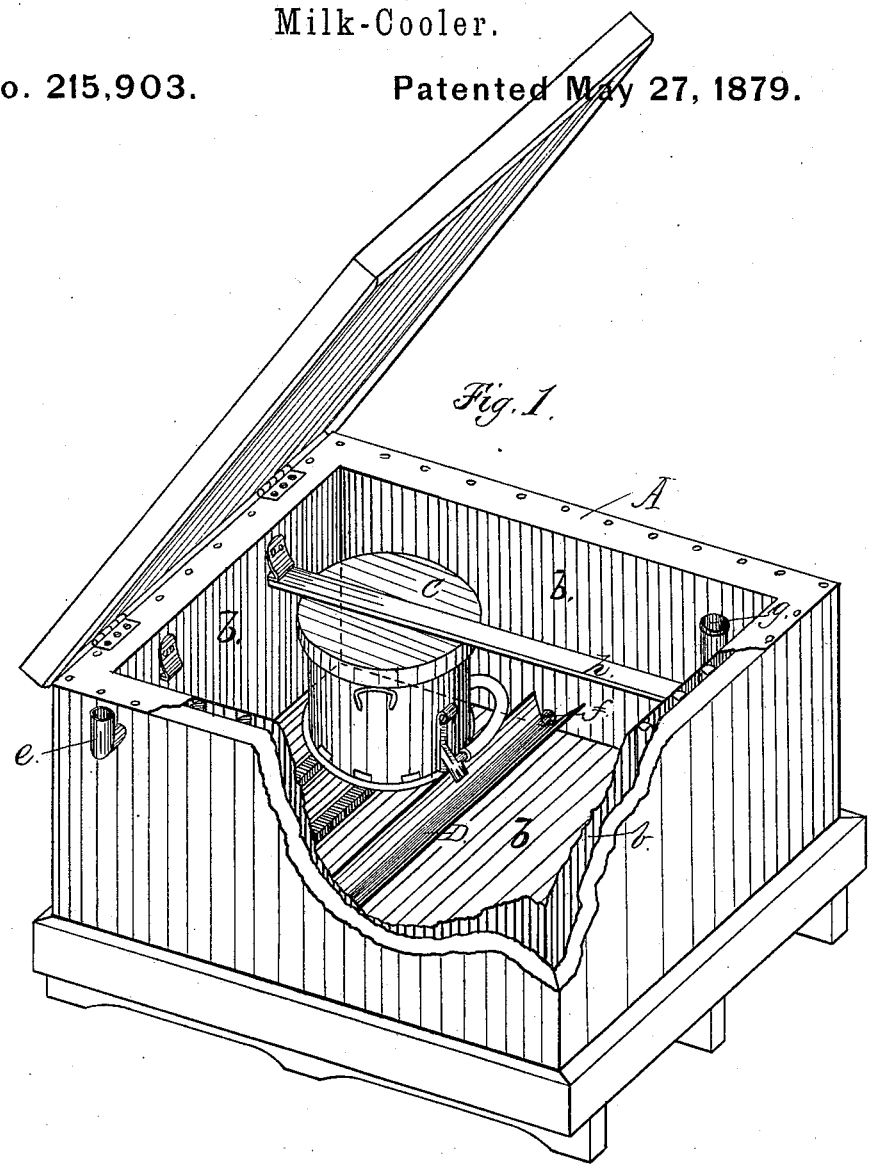

UNITED STATES PATENT OFFICE.

DE WITT FORD, OF ONEONTA, NEW YORK, AND FRANCIS G. BUTLER, OF BELLOWS FALLS, ASSIGNORS TO VERMONT FARM MACHINE COMPANY, OF BELLOWS FALLS, VERMONT.

IMPROVEMENT IN MILK-COOLERS.

Specification forming part of Letters Patent No. 215,903, dated May 27, 1879; application filed November 24, 1877.

*To all whom it may concern:*

Be it known that we, DE WITT FORD, of Oneonta, New York, and FRANCIS G. BUTLER, of Bellows Falls, in the State of Vermont, have invented certain new and useful Improvements in Milk-Coolers and Cream-Raisers; and we do hereby declare that the following is a full, clear, and exact description of the invention, which will enable others skilled in the art to which it appertains to make and use the same, reference being had to the accompanying drawing, and to letters of reference marked thereon, which form a part of this specification.

Our invention relates to improvements in the construction of tanks or coolers for holding water, in which cans or vessels for containing milk are set for the purpose of cooling the milk and raising the cream; and it consists mainly in the arrangement of a trough or equivalent device near the bottom of the cooler communicating with an outlet through the same for the purpose of conveying away the skim-milk from the cans without having to lift them out of the cooler.

The invention is in part more particularly applicable for use with such cans as are constructed for discharging the skim-milk at or near the bottom of the can, and leaving the cream in the can to be subsequently and separately removed, as shown, for instance, in the Cooley patent, No. 187,516, and in the F. G. Butler patent, No. 194,510.

The accompanying drawing shows a tank or cooler embodying our improvements, a portion of the same being broken away the better to display its construction.

A is the tank or cooler for containing the cool water in which the milk-cans are to be placed. It is made of wood; but instead of having its metallic lining $b$ applied directly upon the wood, it is kept apart from it by a series of ribs or strips, as shown, thus leaving an air-space between them.

C illustrates one of the cans; D, the trough into which they discharge their contents after the cream is raised, (in case the cooling process be continued long enough for that purpose,) or at any other desired period. $e$ is a pipe for admitting water to the tank, its exit end being near the bottom of the tank. $f$ is the outlet from the trough D, and which may have any appropriate plug or spigot; $g$, a waste or overflow pipe, and $h$ one of the cross-bars used for holding the lids or covers of the cans firmly to place during the process of cooling the milk.

The tanks may be of any convenient size, and adapted to hold as many cans as desired, the latter being preferably placed on opposite sides of the trough D, so that all may discharge their contents into a single trough; but the position of the trough may, of course, be varied to suit circumstances.

As coolers have heretofore been constructed with the lining in contact with the wood-work, the water in the cooler being in warm weather necessarily colder than the surrounding air, the moisture in the atmosphere is condensed upon the lining, and the wood-work becomes saturated with water, thus swelling and warping the cooler, straining the lining, and producing leaks.

We find in practice with coolers constructed with our improvements that when ice is used to reduce the temperature of the water in the cooler to the desired degree for properly cooling the milk much less ice is required, the water remains cold for a longer time, and no difficulty is experienced by reason of the wood-work swelling, as but little if any moisture condenses upon the lining.

To save the labor of lifting the cans of milk from the cooler for the purpose of emptying them, we place a trough or conductor at or near the bottom of the cooler, into which trough or conductor the contents of the cans after the water is first let off are discharged and conducted away through the outlet. When cans are set on each side of the cooler we place the trough near the center. If the cooler is constructed for a single row of cans the trough may be placed at one side, as most convenient.

When necessary to remove the skim-milk from the cans, we first draw off the water from the bottom of the cooler and open the valves at the bottom of the cans, allowing the milk to pass off into the trough through the outlet into its receptacle, and leaving only the cream in the cans. By lowering the slide-valve the cream may then be removed in the same manner, or the can may now be easily lifted out and the cream poured out from the top or mouth of the can.

It will be seen that, the trough D having but a small surface relatively to the area of the bottom of the tank, but little of the sediment from the water or from the water and ice in the tank ever gets into such trough, but on the contrary will be left on the bottom of the tank, and cannot under any conditions mingle with or foul the milk or cream, as they are discharged from the can C by the agency of the trough, and no deposit from the water, however impure, will come in contact with the milk or cream. The trough itself can be readily cleansed, if need be, at a moment's notice just before letting out the milk into it from the tank or tanks.

We claim—

A milk-cooling tank having the conducting-trough D within the same, and located near its bottom, and serving to discharge the milk or the milk and cream separately from the can or cans after the water has first been drawn off from the tank, substantially as shown and described.

In testimony that we claim the foregoing as our invention we affix our signatures in presence of two witnesses.

DE WITT FORD.
FRANCIS G. BUTLER.

Witnesses:
FRED WILCOX,
H. E. FARMER.